Patented Oct. 22, 1935

2,017,980

UNITED STATES PATENT OFFICE

2,017,980

CRYSTALLIZATION OF MANGANESE NITRATE HYDRATE

Howard S. McQuaid, Lakewood, Ohio, assignor to The Grasselli Chemical Company, Cleveland, Ohio, a corporation of Delaware No Drawing. Application October 25, 1933, Serial No. 695,163

3 Claims. (Cl. 23—102)

The present invention refers to a process of producing manganese nitrate hydrate in the form of loose crystals and consists substantially in agitating a melt of manganese nitrate hydrate in contact, or in the presence of solid carbon dioxide.

Manganese nitrate crystallizes with 6 or 3 mols of water of crystallization, the melting points of these two hydrates being 25.8° C. for the hexahydrate and 35.5° C. for the trihydrate. These products are usually obtained by preparing melts of the corresponding composition and cooling them by indirect application of a cooling fluid. Hydrates of intermediate composition and intermediate melting point can be obtained in a similar manner. They represent probably mixtures of the above two hydrates, rather than well defined hydrates of constant composition.

Produced in this manner the hydrates represent hard solid and compact masses. They are not easily dissolved in water and cannot directly be mixed with other solid materials.

The manganese nitrate hydrates are very hygroscopic and for this reason and due to their low melting point they can only be disintegrated with difficulty.

Manganese nitrate hydrates have furthermore a very high heat of crystallization and the melts are very viscous during cooling. It is, therefore, quite impossible to produce the manganese nitrate hydrates direct in solid comminuted form by stirring their melts with the application of indirect or external cooling.

These various difficulties in producing a disintegrated manganese nitrate hydrate have heretofore been in the way of the economical employment of these materials in the various uses for which they are adapted.

I have found that by adding solid carbon dioxide to a melt of manganese nitrate hydrate and stirring the mass, the hydrate solidifies in the form of loose crystals, the mass resembling light dry snow. The evaporation of the solid carbon dioxide produces the necessary cooling effect to solidify the hydrate and the gas evolved prevents the crystals from agglomerating.

This process is applicable to the trihydrate, the hexahydrate or to any melts of intermediate composition.

I have produced a loose crystalline manganese nitrate hydrate in the following manner:

304 lbs. of 43° Bé. nitric acid was put into a 100 gallon chemical stoneware crock. 210 lbs. of manganese carbonate was added over a period of three hours. After solution of the carbonate the manganese nitrate was allowed to cool to room temperature where it remained as a semi-viscous mass. 70 to 80 lbs. crushed, solid carbon dioxide was then mixed into the manganese nitrate melt with occasional stirring. The manganese nitrate solidified in the form of loose crystals which had a composition about $Mn(NO_3)_2.3H_2O$.

The amounts of solid carbon dioxide necessary to solidify the manganese nitrate hydrate must necessarily be sufficient to overcome the crystallization heat of the nitrate, though part of it can be supplemented by exterior, indirect cooling of the melt and will, therefore, depend to a certain extent upon the original temperature of the melt and ambient weather conditions.

I claim:

1. In a process of producing a manganese nitrate hydrate in the form of loose crystals the step of adding solid carbon dioxide to a melt of a manganese nitrate hydrate and stirring the mixture.

2. The process of crystallizing a manganese nitrate hydrate by stirring its melt with solid carbon dioxide in direct, intimate contact with said melt.

3. Manganese nitrate hydrate in the form of separate crystals, a mass of such crystals resembling light, dry snow.

HOWARD S. McQUAID.